US012492639B2

(12) United States Patent
Jang

(10) Patent No.: US 12,492,639 B2
(45) Date of Patent: Dec. 9, 2025

(54) AIRFOIL AND GAS TURBINE INCLUDING SAME

(71) Applicant: DOOSAN ENERBILITY CO., LTD., Changwon-si (KR)

(72) Inventor: Yun Chang Jang, Changwon-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/789,301

(22) Filed: Jul. 30, 2024

(65) Prior Publication Data

US 2025/0207501 A1 Jun. 26, 2025

(51) Int. Cl.
 *F01D 5/18* (2006.01)
(52) U.S. Cl.
 CPC ........ *F01D 5/187* (2013.01); *F05D 2240/303* (2013.01); *F05D 2240/304* (2013.01); *F05D 2240/305* (2013.01); *F05D 2240/306* (2013.01)
(58) Field of Classification Search
 CPC ...................................... F01D 5/187
 See application file for complete search history.

(56) References Cited

U.S. PATENT DOCUMENTS

| 5,405,242 A | 4/1995 | Auxier et al. |
|---|---|---|
| 5,931,638 A * | 8/1999 | Krause .................. F01D 5/187 |
| | | 415/115 |
| 6,254,334 B1 * | 7/2001 | LaFleur .................. F01D 25/12 |
| | | 415/115 |
| 6,379,118 B2 * | 4/2002 | Lutum .................. F01D 5/186 |
| | | 416/97 R |
| 6,773,230 B2 | 8/2004 | Bather et al. |
| 7,854,591 B2 | 12/2010 | Liang |
| 2011/0123311 A1 | 5/2011 | Devore et al. |
| 2014/0033736 A1 | 2/2014 | Propheter-Hinckley et al. |
| 2019/0093486 A1 | 3/2019 | Bang |

(Continued)

FOREIGN PATENT DOCUMENTS

| CN | 110145371 A | 8/2019 |
|---|---|---|
| EP | 1091092 A2 | 11/2001 |

(Continued)

OTHER PUBLICATIONS

European Search Report, In Corresponding European Application No. 24195422.1-1004 Dated Month Mar. 2025.

*Primary Examiner* — Sabbir Hasan
(74) *Attorney, Agent, or Firm* — Shook, Hardy & Bacon L.L.P.

(57) ABSTRACT

An airfoil and a gas turbine including the airfoil. The airfoil includes a suction side and a pressure side having a cooling hole, a main cavity which is formed in an inner space formed by the suction side and the pressure side and into which a cooling fluid is introduced, an inner cooling flow path formed inside a wall body forming the pressure side and the suction side, and a collision jet hole formed in inner surfaces of the suction side and the pressure side and configured to perform colliding and cooling by introducing the cooling fluid into the inner cooling flow path, and a sub-cavity surrounding an inner cooling flow path outlet formed on an end portion of the inner cooling flow path, the sub-cavity being configured such that the inner cooling flow path outlet and a cooling hole inlet are in communication with each other.

19 Claims, 10 Drawing Sheets

(56) References Cited

U.S. PATENT DOCUMENTS

| | | | |
|---|---|---|---|
| 2019/0226343 | A1 | 7/2019 | LoRicco et al. |
| 2020/0024987 | A1 | 1/2020 | Bunker |
| 2020/0332713 | A1 | 10/2020 | Propheter-Hinckley |

FOREIGN PATENT DOCUMENTS

| | | | |
|---|---|---|---|
| JP | S56148601 A | 11/1981 | |
| JP | H11107702 A | 4/1999 | |
| JP | 2001107704 A | 4/2001 | |
| JP | 2001511864 A | 8/2001 | |
| JP | 2005069236 A | 3/2005 | |
| JP | 2017040256 A | 2/2017 | |
| JP | 2019019820 A | 2/2019 | |
| KR | 1020100064754 A | 6/2010 | |
| KR | 20180123632 A | 11/2018 | |
| WO | 2007099895 A1 | 7/2009 | |

\* cited by examiner

AIRFOIL AND GAS TURBINE INCLUDING SAME

CROSS-REFERENCE TO RELATED APPLICATIONS

The present application claims priority to Korean Patent Application No. 10-2023-0191506, filed Dec. 26, 2023, the entire contents of which are incorporated herein for all purposes by this reference.

FIELD

The present disclosure relates to and airfoil and a gas turbine including the airfoil.

BACKGROUND

A turbine is a mechanical apparatus that obtains a rotational force by an impulsive force or reaction force using a flow of a compressible fluid such as steam or gas. The turbine includes a steam turbine using steam and a gas turbine using a high temperature combustion gas.

Among the steam turbine and the gas turbine, the gas turbine is mainly composed of a compressor, a combustor, and a turbine. The compressor is provided with an air inlet for introducing air, and a plurality of compressor vanes and a plurality of compressor blades are alternately arranged in a compressor casing.

The combustor supplies fuel to the compressed air compressed in the compressor and ignites a fuel-air mixture with a burner, thereby producing a high-temperature and high-pressure combustion gas.

The turbine has a plurality of turbine vanes and a plurality of turbine blades disposed alternately in a turbine casing. In addition, a rotor is arranged such that the rotor passes through centers of the compressor, the combustor, the turbine, and an exhaust chamber.

Both ends of the rotor are rotatably supported by bearings. In addition, a plurality of discs are fixed to the rotor so that respective blades connected to the discs are connected to each other, and a drive shaft such as a generator is connected to an end portion of the exhaust chamber.

Since such a gas turbine has no reciprocating mechanism such as a piston in a 4-stroke engine, so that there is no mutual frictional part such as a piston-cylinder. Therefore, the gas turbine has advantages in that consumption of lubricating oil is extremely small, amplitude as a characteristic of a reciprocating machine is greatly reduced, and high speed operation is possible.

Briefly describing the operation of the gas turbine, the compressed air in the compressor is mixed with fuel and combusted to produce a high-temperature combustion gas, and the combustion gas is injected toward the turbine. The injected combustion gas passes through the turbine vanes and the turbine blades to generate a rotational force, so that the rotor is rotated.

SUMMARY

Accordingly, the present disclosure has been made keeping in mind the above problems occurring in the related art, and an objective of the present disclosure is to provide an airfoil with an increased cooling efficiency and to provide a gas turbine including the airfoil.

According to an aspect of the present disclosure, there is provided an airfoil including: a suction side and a pressure side that are each provided with a cooling hole; at least one main cavity which is formed in an inner space formed by the suction side and the pressure side and into which a cooling fluid is introduced; an inner cooling flow path formed inside a wall body forming the pressure side and the suction side; a collision jet hole provided as a plurality of collision jet holes formed in inner surfaces of the suction side and the pressure side, the collision jet hole being configured to perform colliding and cooling by introducing the cooling fluid into the inner cooling flow path; and a sub-cavity formed such that the sub-cavity surrounds an inner cooling flow path outlet formed on an end portion of the inner cooling flow path, the sub-cavity being configured such that the inner cooling flow path outlet and a cooling hole inlet are in communication with each other.

In the airfoil according to an aspect of the present disclosure, the collision jet hole may be provided as the plurality of collision jet holes formed in the inner surfaces of the suction side and the pressure side along a span direction, such as span direction 2004.

In the airfoil according to an aspect of the present disclosure, the collision jet hole may be formed in a trailing edge, and the inner cooling flow path outlet may be formed in a leading edge.

In the airfoil according to an aspect of the present disclosure, the sub-cavity may be provided as a plurality of sub-cavities formed in the inner surfaces of the suction side and the pressure side along a span direction.

In the airfoil according to an aspect of the present disclosure, the airfoil may further include a first fin which protrudes toward a second surface inside a wall body from a first surface inside the wall body forming the inner cooling flow path and which is formed by being spaced apart from the second surface inside the wall body.

In the airfoil according to an aspect of the present disclosure, the first cooling fin may be formed between any one collision jet hole and an adjacent collision jet hole.

In the airfoil according to an aspect of the present disclosure, the airfoil may further include a cooling protrusion which protrudes toward a first surface inside a wall body from a second surface inside the wall body forming the inner cooling flow path and which is formed below the collision jet hole.

In the airfoil according to an aspect of the present disclosure, the airfoil may further include a second cooling fin formed by connecting a first surface and a second surface inside a wall body to each other, the wall body forming the inner cooling flow path.

In the airfoil according to an aspect of the present disclosure, the second cooling fin may be formed between any one collision jet hole and an adjacent collision jet hole.

In the airfoil according to an aspect of the present disclosure, the airfoil may further include a collision cavity configured such that the cooling fluid collides with a surface of the wall body forming the suction side or with a surface of the wall body forming the pressure side before the cooling fluid discharged through the inner cooling flow path outlet is discharged to an outside through the cooling hole.

According to an aspect of the present disclosure, there is provided a gas turbine including: a compressor configured to compresses air that is introduced thereinto; a combustor configured to mix fuel with air that is compressed in the compressor and to combust a mixture of the compressed air and the fuel; and a turbine configured to generate power from gas combusted in the combustor, the turbine including a turbine vane configured to guide the combustion gas on a combustion gas path through which the combustion gas passes, and the turbine including a turbine blade configured to be rotated by the combustion gas on the combustion gas path. Here, at least one of the turbine vane or the turbine blade includes an airfoil. Here, the airfoil includes: a suction side and a pressure side that are each provided with a cooling hole; at least one main cavity which is formed in an inner space formed by the suction side and the pressure side and into which a cooling fluid is introduced; an inner cooling flow path formed inside a wall body forming the pressure side and the suction side; a collision jet hole provided as a plurality of collision jet holes formed in inner surfaces of the suction side and the pressure side, the collision jet hole being configured to perform colliding and cooling by introducing the cooling fluid into the inner cooling flow path; and a sub-cavity formed such that the sub-cavity surrounds an inner cooling flow path outlet formed on an end portion of the inner cooling flow path, the sub-cavity being configured such that the inner cooling flow path outlet and a cooling hole inlet are in communication with each other.

In the gas turbine according to an aspect of the present disclosure, the collision jet hole may be provided as the plurality of collision jet holes formed in the inner surfaces of the suction side and the pressure side along a span direction.

In the gas turbine according to an aspect of the present disclosure, the collision jet hole may be formed in a trailing edge, and the inner cooling flow path outlet may be formed in a leading edge.

In the gas turbine according to an aspect of the present disclosure, the sub-cavity may be provided as a plurality of sub-cavities formed in the inner surfaces of the suction side and the pressure side along a span direction.

In the gas turbine according to an aspect of the present disclosure, the gas turbine may further include a first fin which protrudes toward a second surface inside a wall body from a first surface inside the wall body forming the inner cooling flow path and which is formed by being spaced apart from the second surface inside the wall body.

In the gas turbine according to an aspect of the present disclosure, the first cooling fin may be formed between any one collision jet hole and an adjacent collision jet hole.

In the gas turbine according to an aspect of the present disclosure, the gas turbine may further include a cooling protrusion which protrudes toward a first surface inside a wall body from a second surface inside the wall body forming the inner cooling flow path and which is formed below the collision jet hole.

In the gas turbine according to an aspect of the present disclosure, the gas turbine may further include a second cooling fin formed by connecting a first surface and a second surface inside a wall body to each other, the wall body forming the inner cooling flow path.

In the gas turbine according to an aspect of the present disclosure, the second cooling fin may be formed between any one collision jet hole and an adjacent collision jet hole.

In the gas turbine according to an aspect of the present disclosure, the gas turbine may further include a collision cavity configured such that the cooling fluid collides with a surface of the wall body forming the suction side or with a surface of the wall body forming the pressure side before the cooling fluid discharged through the inner cooling flow path outlet is discharged to an outside through the cooling hole.

Other details of implementations according to various aspects of the present disclosure are included in the detailed description below.

According to an aspect of the present disclosure, the cooling efficiency may be increased by: i) cooling by collision of the cooling fluid with the inner cooling flow path; ii) increasing the cooling time due to inner flow of the cooling fluid in the inner cooling flow path; and iii) increasing the air curtain effect due to discharge of the cooling fluid through the cooling hole that is adjacent to the leading edge.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
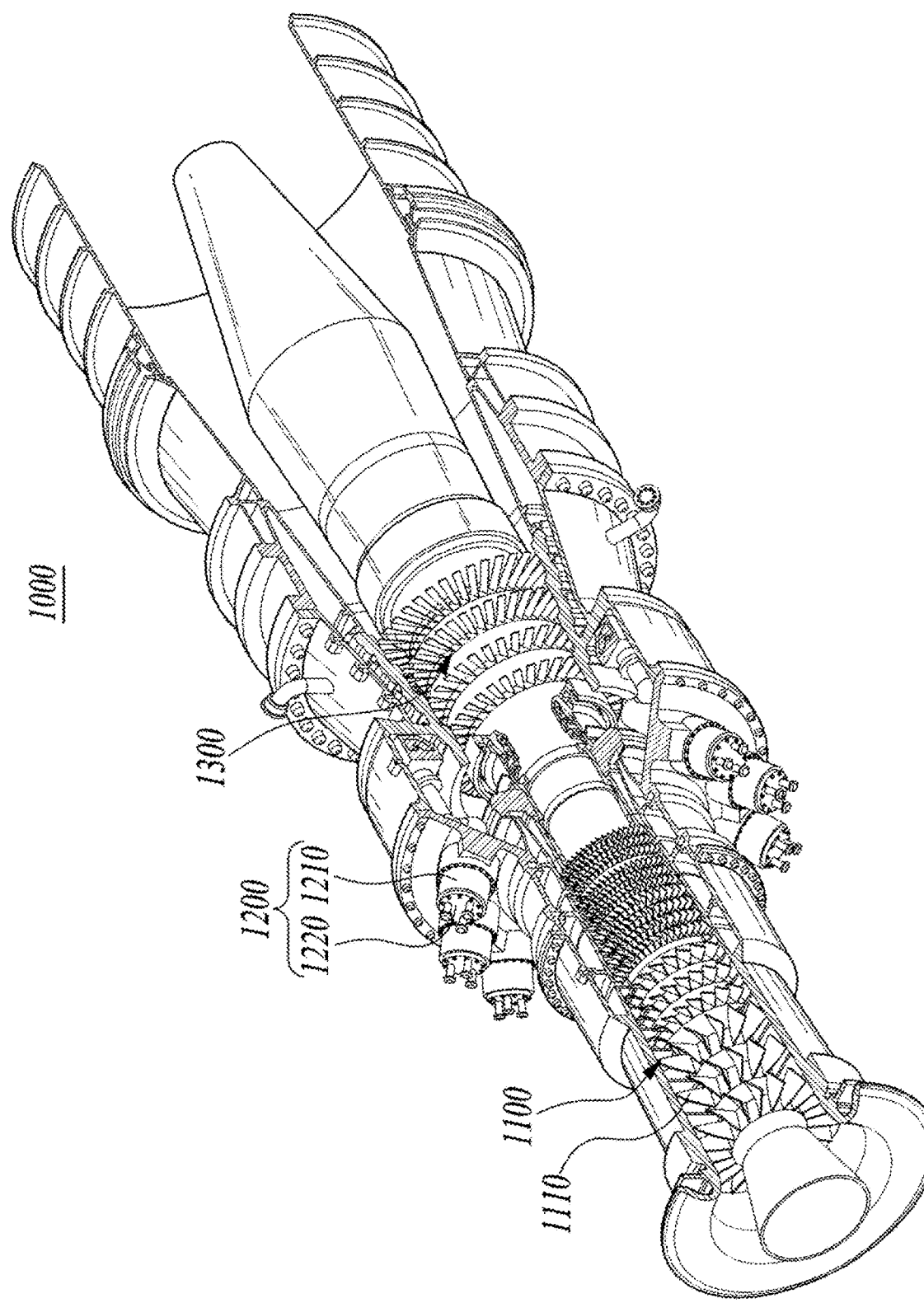
FIG. 1 is a view illustrating an inner portion of a gas turbine according to embodiments of the present disclosure.

The present disclosure may be variously modified and may have various embodiments, and specific embodiments will now be described in detail. However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure.

The terminology used herein is for the purpose of describing specific embodiments only and is not intended to limit the scope of the present disclosure. Singular expressions include plural expressions unless the context clearly indicates otherwise. In the present disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments of the present disclosure will be described below in detail with reference to the accompanying drawings. At this time, it should be noted that like reference numerals refer to like parts throughout various drawings and exemplary embodiments. Furthermore, detailed descriptions related to well-known functions or configurations may be omitted in order not to unnecessarily obscure subject matters of the present disclosure. For the same reason, some components may be exaggerated, omitted, or schematically illustrated in the accompanying drawings.

The present disclosure may be variously modified and may have various embodiments, and specific embodiments will now be described in detail. However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure.

The terminology used herein is for the purpose of describing specific embodiments only and is not intended to limit the scope of the present disclosure. Singular expressions include plural expressions unless the context clearly indicates otherwise. In the present disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments of the present disclosure will be described below in detail with reference to the accompanying drawings. It should be noted that like reference numerals refer to like parts throughout various drawings and exemplary embodiments. Furthermore, detailed descriptions related to well-known functions or configurations may be omitted in order not to unnecessarily obscure subject matters of the present disclosure. For the same reason, some components may be exaggerated, omitted, or schematically illustrated in the accompanying drawings.

Figure 2:
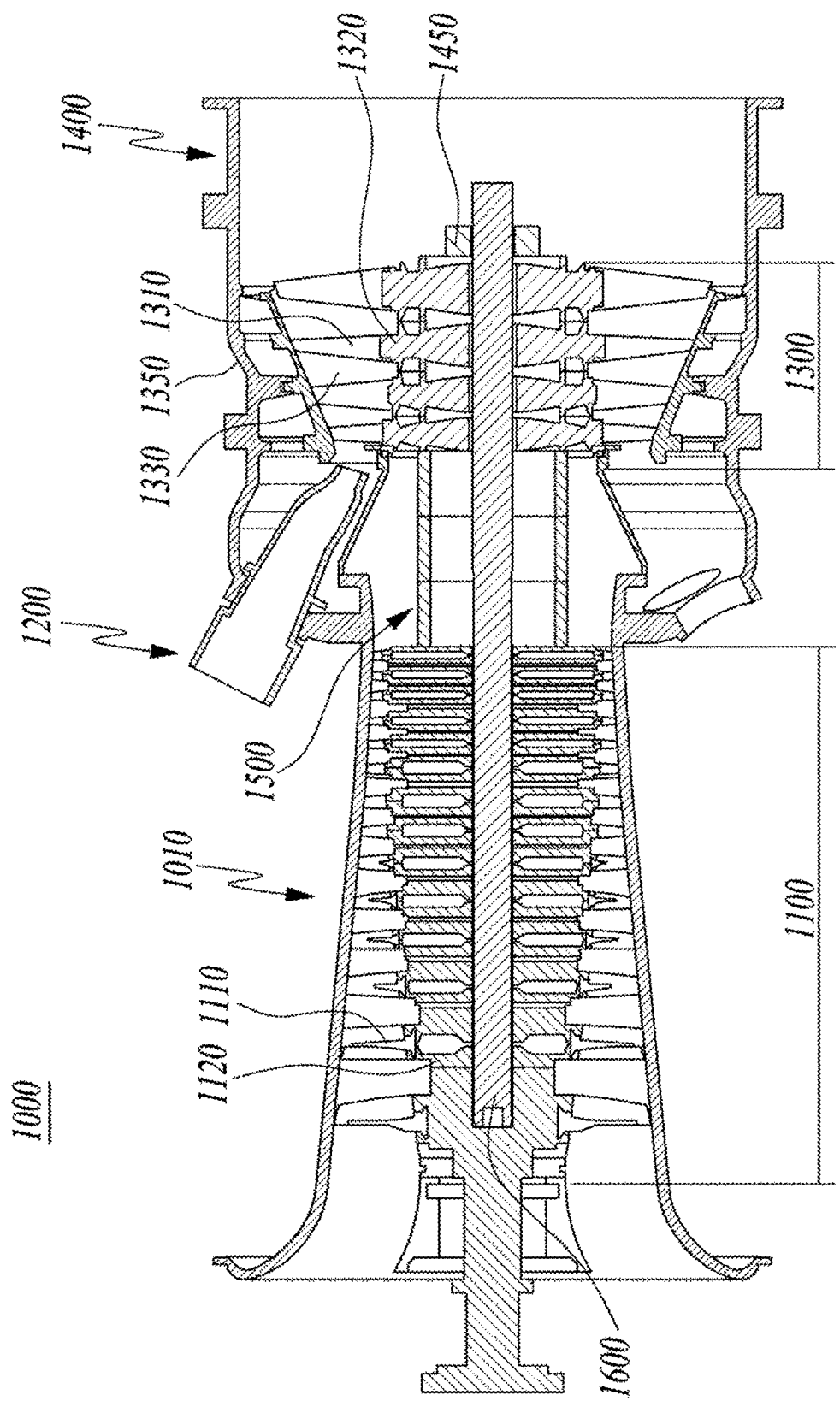
FIG. 2 is a view conceptually illustrating a cross-sectional surface of the gas turbine according to embodiments of the present disclosure.

FIG. 1 is a partial cutaway perspective view illustrating a gas turbine according to an exemplary embodiment of the present disclosure, and FIG. 2 is a cross-sectional view illustrating a schematic structure of the gas turbine according to an exemplary embodiment of the present disclosure.

As illustrated in FIG. 1, a gas turbine 1000 according to a first embodiment of the present disclosure includes a compressor 1100, a combustor 1200, and a turbine 1300. The compressor 1100 is provided with a plurality of compressor blades 1110 mounted radially. The compressor 1100 rotates the compressor blades 1110, and air is compressed and flows by the rotation of the compressor blades 1110. The sizes and installation angles of the compressor blades 1110 may vary according to the installation positions of the compressor blades 1110. In the first embodiment, the compressor 1100 may be directly or indirectly connected to the turbine 1300, and may receive a portion of the power generated from the turbine 1300 and may rotate the compressor blades 1110.

Air compressed from the compressor 1100 flows to the combustor 1200. The combustor 1200 includes a plurality of combustion chambers 1210 and a plurality of fuel nozzle modules 1220 disposed annularly.

As illustrated in FIG. 2, the gas turbine 1000 according to the first embodiment of the present disclosure is provided with a housing 1010, and a diffuser 1400 to which a combustion gas passing through the turbine is provided on a rear side of the housing 1010. In addition, the combustor 1200 configured to receive and combust compressed air supplied thereto is disposed in front of the diffuser 1400.

In describing the present disclosure on the basis of a flow direction of air, the compressor 1100 is positioned on an upstream side of the housing 1010, and the turbine 1300 is disposed on a downstream side. In addition, a torque tube 1500 as a torque transmission member that transmits the rotational torque generated from the turbine 1300 to the compressor 1100 is disposed between the compressor 1100 and the turbine 1300.

The compressor 1100 is provided with a plurality of compressor rotor discs 1120 (for example, 14 compressor rotor discs), and each of the compressor rotor discs 1120 is fastened by a tie rod 1600 such that each of the compressor rotor discs 1120 is not spaced apart in an axial direction.

Specifically, each of the compressor rotor discs 1120 is aligned along the axial direction while being in a state in which the tie rod 1600 constituting a rotary shaft passes approximately through a central portion of each of the compressor rotor discs 1120. Here, adjacent compressor rotor discs 1120 are disposed such that facing surfaces thereof are in tight contact with each other by the tie rod so that the adjacent compressor rotor discs 1120 cannot rotate relative to each other.

The plurality of compressor blades 1110 are radially coupled to each outer circumferential surface of each of the compressor rotor discs 1120. Each of the compressor blades 1110 is fastened to each of the compressor rotor discs 1120.

Compressor vanes (not illustrated) fixed to and disposed in the housing are positioned between each of the compressor rotor discs 1120. Unlike the rotor discs, the compressor vanes are fixed such that the compressor vanes do not rotate, and the compressor vanes serve to align the flow of compressed air that has passed through the compressor blades 1110 of the compressor rotor discs 1120 so that the air is guided to the compressor blades 1110 of the compressor rotor discs 1120 positioned at the downstream side.

The tie rod 1600 is disposed such that the tie rod 1600 passes through central portions of the plurality of compressor rotor discs 1120 and a plurality of turbine rotor discs 1320, and the tie rod 1600 may be provided as a single tie rod or a plurality of tie rods. A first end portion of the tie rod 1600 is fastened to the compressor rotor disc that is positioned at the most upstream side, and a second end portion of the tie rod 1600 is fastened by a fixing nut 1450.

A shape of the tie rod 1600 is not limited to the shape illustrated in FIG. 2, and may be formed in various structures according to the gas turbine. That is, the shape in which one tie rod passes through the central portions of the rotor discs as illustrated in the drawing may be realized, another shape in which a plurality of tie rods is arranged circumferentially may be realized, or a combination of the two shapes described above may be realized.

Although not illustrated in the drawings, in order to increase the pressure of fluid and then adjust an inflow angle of the fluid entering into an inlet of the combustor to a designed inflow angle, a deswirler serving as a guide vane may be installed at the rear stage of the diffuser.

The combustor 1200 mixes fuel with the introduced compressed air, burns a fuel-air mixture to produce high-temperature and high-pressure combustion gas with high energy, and increases the temperature of the combustion gas to a temperature at which the combustor and the turbine components are able to be resistant to heat through an isobaric combustion process.

A plurality of combustors constituting a combustion system of the gas turbine may be arranged in the housing in a form of a cell. Each of the combustors may include a burner having a fuel injection nozzle and so on, a combustor liner forming a combustion chamber, and a transition piece serving as a connection part between the combustor and the turbine.

In detail, the combustor liner provides a combustion space in which fuel injected by the fuel injection nozzle is mixed with the compressed air supplied from the compressor and combusted. Such a combustor liner may include a flame container providing the combustion space in which fuel mixed with air is combusted, and may include a flow sleeve forming an annular space while surrounding the flame container. In addition, the fuel injection nozzle is coupled to a front end of the combustor liner, and an ignition plug is coupled to a side wall of the combustor liner.

The transition piece is connected to a rear end of the combustor liner such that the combustion gas combusted by the ignition plug is capable of being transferred toward the turbine. An outer wall of such a transition piece is cooled by a compressed air supplied from the compressor so as to prevent the transition piece from being damaged due to the high temperature of the combustion gas.

To this end, the transition piece is provided with holes for cooling such that air is capable of being injected into the inside of the transition piece through the holes, and the compressed air cools the inside of the transition piece and then flows toward the combustor liner.

The compressed air that has cooled the transition piece may flow into an annular space of the combustor liner, and may be supplied as a cooling air through the holes formed in the flow sleeve from the outside of the flow sleeve to an outer wall of the combustor liner.

The high-temperature and high-pressure combustion gas ejected from the combustor is supplied to the turbine 1300. The supplied high-temperature and high-pressure combustion gas expands and applies impingement or reaction force to a turbine rotation wing to generate rotational torque. A portion of the obtained rotational torque is transmitted via the torque tube 1500 to the compressor, and the remaining portion which is the excessive torque is used to drive a generator or the like.

The turbine 1300 basically has a structure similar to the compressor. That is, the turbine 1300 includes the plurality of turbine rotor discs 1320 similar to the compressor rotor discs of the compressor. Therefore, the plurality of turbine rotor discs 1320 also includes a plurality of turbine blades 1310 arranged radially. The turbine blades 1310 may be coupled to the turbine rotor discs 1320 in a dovetail coupling manner or the like. In addition, a plurality of turbine vanes 1330 fixed to a turbine casing 1350 is provided between the turbine blades 1310, and is configured to guide a flow direction of the combustion gas passing through the turbine blades 1310.

An airfoil according to embodiments of the present disclosure may be an airfoil applied to at least one of the compressor blade 1110, the compressor vane, the turbine blade 1310, and the turbine vane 1330. In the description below, an airfoil applied to the turbine blade 1310 of the gas turbine will be described as an example. In addition, the technical ideas described in the present specification are not limited to the gas turbine, but may be applied to a steam turbine and may be applied to an apparatus provided with an airfoil.

Figure 3:
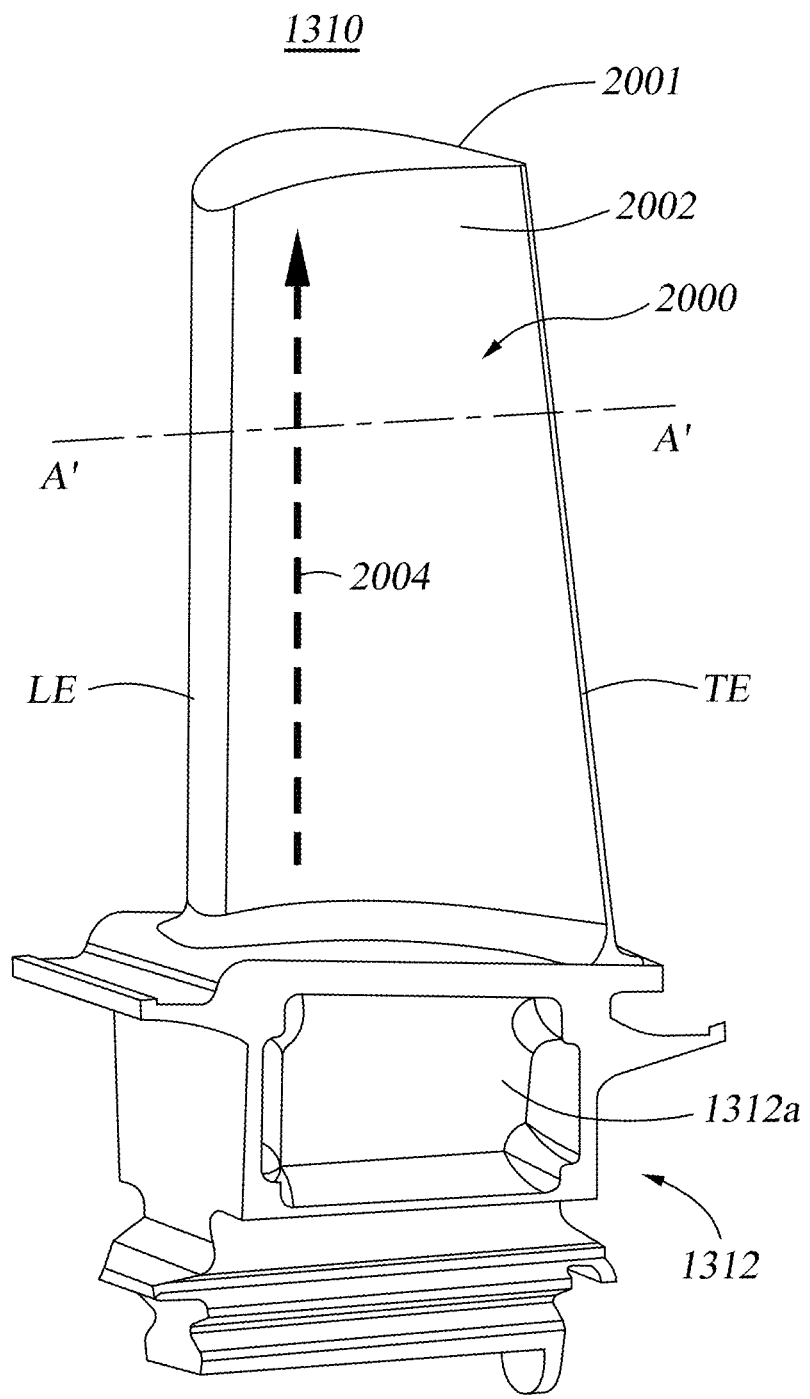
FIG. 3 is a perspective view illustrating a turbine blade including an airfoil according to embodiments of the present disclosure.
Figure 4:
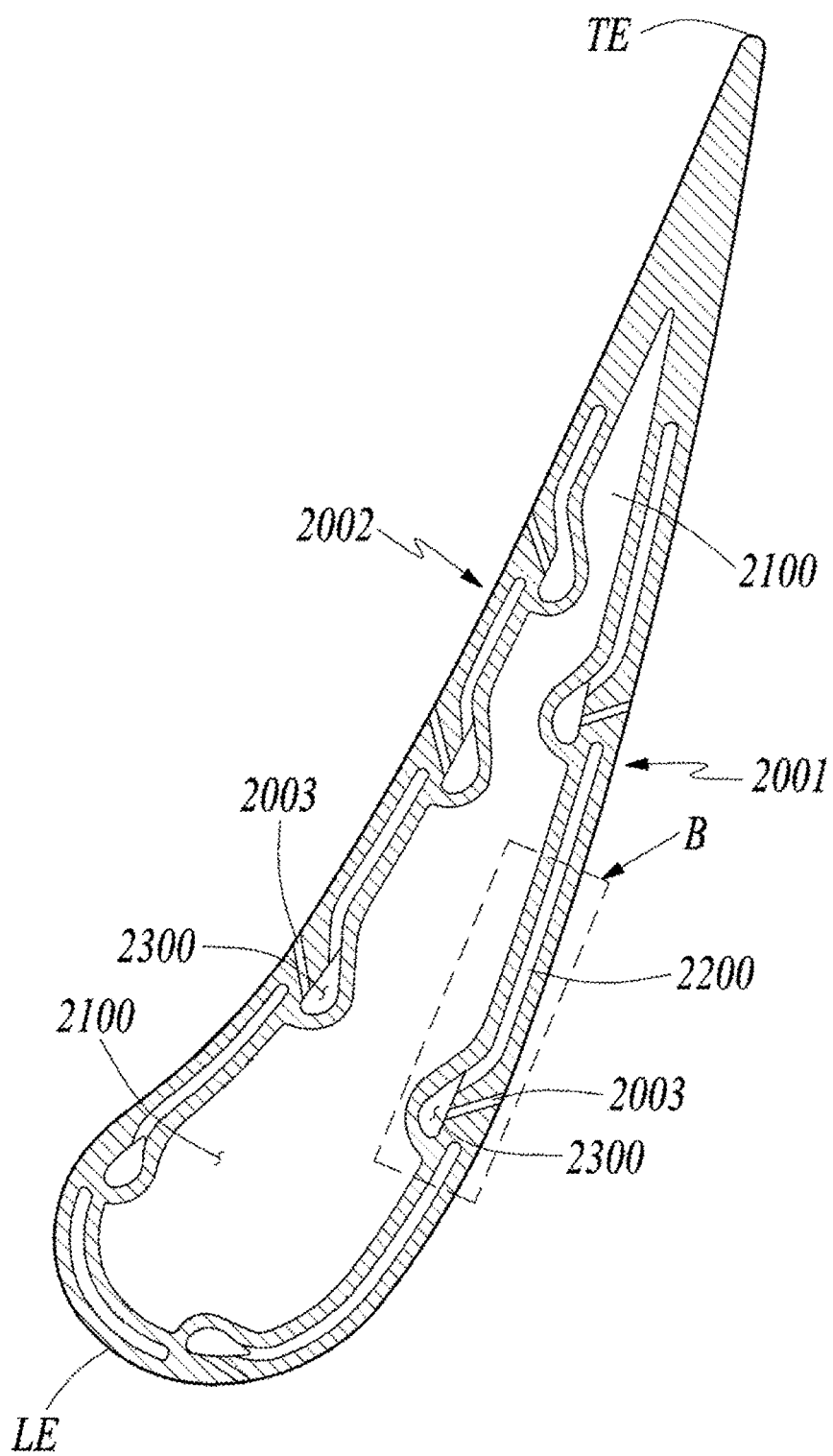
FIG. 4 is a plan view taken along line A-A' in FIG. 3 and viewed from above.

FIG. 3 is a perspective view illustrating a turbine blade including an airfoil according to embodiments of the present disclosure, and FIG. 4 is a plan view taken along line A-A' in FIG. 3 and viewed from above.

The turbine blade 1310 according to embodiments of the present disclosure includes a root part 1312 and an airfoil 2000.

Referring to FIG. 3, the turbine blade 1310 is mounted on the turbine rotor disc 1320 and is configured such that the turbine is rotated by a high-pressure combustion gas. Furthermore, the root part 1312 coupled to the turbine rotor disc 1320 is formed on a lower side of the turbine blade 1310, the airfoil 2000 configured to be rotated by an air pressure is integrally coupled to an upper side of the root part 1312, and the turbine is configured to be rotated by a pressure difference between front and rear surfaces of the airfoil 2000.

A shank and a platform which protrude outward are formed on an outer surface of the root part 1312, thereby realizing a rigid fixing. The root part 1312 is provided with an inlet port 1312a through which a cooling fluid flows into the airfoil 2000. The cooling fluid is a portion of compressed air compressed by the compressor 1100, is supplied to the root part 1312 of the turbine blade 1310 from the compressor 1100, and is introduced into the airfoil 2000 through the inlet port 1312a, thereby cooling the turbine blade 1310. Alternatively, the cooling fluid is supplied to the root part 1312 through an inner flow path (not illustrated) that is connected from the compressor 1100 to the turbine 1300, and is introduced into the airfoil 2000 through the inlet port 1312a, thereby cooling the turbine blade 1310.

The airfoil 2000 is disposed on the upper side of the root part 1312. Meanwhile, when the airfoil 2000 is formed on the turbine vane 1330, the airfoil 2000 is formed between an outer shroud and an inner shroud, and the cooling fluid is introduced through a cooling fluid flow path formed in the outer shroud or through a cooling fluid flow path formed in the inner shroud.

A suction side 2001 that protrudes and is convexly curved outward is formed on a front surface of the airfoil 2000 into which the combustion gas is introduced, and a pressure side 2002 concavely curved inward toward the suction side 2001 is formed on a rear side of the airfoil 2000, so that a difference in pressure applied to the front and rear surfaces of the airfoil 2000 is maximized, thereby realizing a smooth air flow.

The airfoil 2000 includes a leading edge LE and a trailing edge TE that are two end portions where the pressure side 2002 and the suction side 2001 are in contact with each other, the leading edge LE refers to a front edge of the airfoil 2000 receiving the fluid that flows to the airfoil 2000, and the trailing edge TE refers to a rear edge of the airfoil 2000. In addition, a direction from the root part toward an airfoil tip is referred to as a span direction.

The airfoil 2000 includes a plurality of cooling holes 2003 formed through the suction side 2001 or the pressure side 2002. As the cooling fluid is discharged to the outside through the cooling holes 2003, an air curtain is formed around the outer surface of the airfoil, thereby cooling the outer surface of the airfoil in a so-called film cooling method.

Referring to FIG. 4, the airfoil 2000 according to embodiments of the present disclosure includes a main cavity 2100, a cooling flow path part 2200, and a sub-cavity 2300.

At least one main cavity 2100 may be formed in an inner space formed by the suction side 2001 and the pressure side 2002 of the airfoil 2000. The main cavity 2100 may be formed along the span direction. When the main cavity 2100 is provided as a plurality of main cavities 2100, the main cavity 2100 may be divided into the plurality of main cavities 2100 along a longitudinal direction that extends from the leading edge LE to the trailing edge TE. In the drawings, it is illustrated that two main cavities are formed, but is not limited thereto.

The cooling fluid that flows through the main cavity 2100 flows and is introduced into the cooling flow path part 2200, thereby cooling the suction side 2001 and the pressure side 2002. The cooling flow path part 2200 is formed inside a wall body forming the suction side 2001 and the pressure side 2002. The cooling flow path part 2200 may be implemented in various shapes, and will be described later with reference to FIG. 5 to FIG. 10.

The sub-cavity 2300 protrudes by a predetermined size from inner surfaces of the suction side 2001 and the pressure side 2002. Similar to the main cavity 2100, the sub-cavity 2300 is provided as a plurality of sub-cavities 2300 in the inner surfaces of the suction side 2001 and the pressure side 2002 along the span direction. The sub-cavity 2300 is formed such that the sub-cavity 2300 surrounds a cooling flow path outlet 2230 (see FIG. 5) and a cooling hole inlet 2003a (see FIG. 5), so that flow between the main cavity 2100 and both the cooling flow path outlet 2230 and the cooling hole inlet 2003a is blocked.

Figure 5:
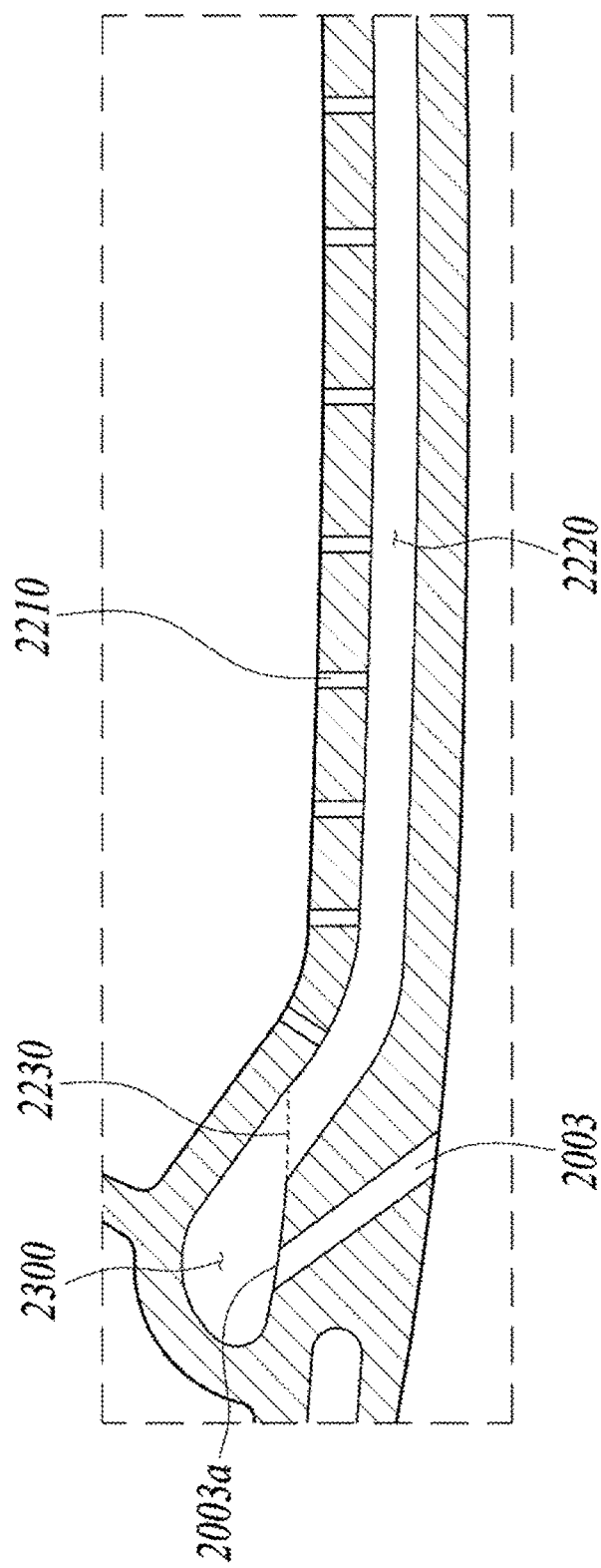
FIG. 5 is a plan view enlarging and illustrating the part B in FIG. 4 and illustrating a portion of the airfoil according to a first embodiment of the present disclosure.
Figure 6:
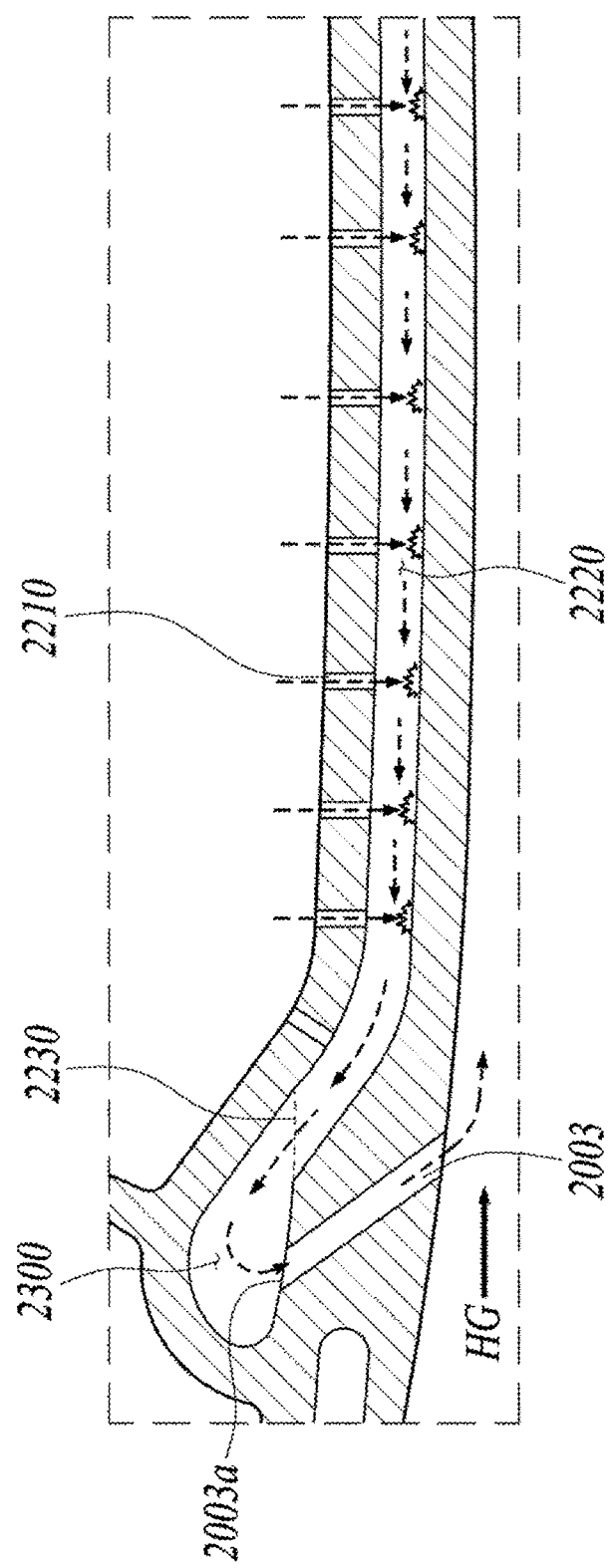
FIG. 6 is a view illustrating a cooling effect due to a flow of a cooling fluid in the airfoil according to the first embodiment of the present disclosure.

FIG. 5 is a plan view enlarging and illustrating the part B in FIG. 4 and illustrating a portion of the airfoil according to a first embodiment of the present disclosure, and FIG. 6 is a view illustrating a cooling effect resulting from flow of a cooling fluid in the airfoil according to the first embodiment of the present disclosure.

Referring to FIG. 5, the cooling flow path part 2200 includes a collision jet hole 2210, an inner cooling flow path 2220, and the cooling flow path outlet 2230.

The collision jet hole 2210 may be provided as a plurality of collision jet holes 2210 formed in the inner surfaces of the suction side 2001 and the pressure side 2002 along the span direction. The cooling fluid introduced through the inlet port 1312a of the root part 1312 may flow along the main cavity 2100 in the span direction and may be introduced into the collision jet hole 2210.

The inner cooling flow path 2220 is formed inside the wall body forming the suction side 2001 and the pressure side 2002. The inner cooling flow path 2220 may extend in a longitudinal direction (a direction connecting the leading edge to the trailing edge) of the wall body from the inside of the wall body.

The cooling flow path outlet 2230 is formed on an end portion of the inner cooling flow path 2220. The cooling flow path outlet 2230 may be formed on the same surface as the collision jet hole 2210. That is, the cooling flow path outlet 2230 may be formed on the inner surfaces of the suction side 2001 and the pressure side 2002.

Referring to FIG. 6, the cooling fluid introduced into the collision jet hole 2210 is firstly cooling the suction side 2001 or the pressure side 2002 by being collided (collision jet) on a first surface of the inner cooling flow path 2220, and performs a second cooling by flowing along the inner cooling flow path 2220, and then is discharged through the cooling flow path outlet 2230. Said another way, the collision jet holes 2210 first provides impingement cooling to the suction side 2001 or the pressure side 2002 then provides convective cooling to the suction side 2001 or the pressure side 2002.

At this time, it is preferable that the collision jet hole 2210 is formed on the trailing edge TE side and the cooling flow path outlet 2230 is formed on the leading edge LE side so that the flow direction of the cooling fluid flowing through the inner cooling flow path 2220 is in a direction opposite to the flow direction of the high-temperature combustion gas HG. In the configuration as described above, since the cooling fluid is discharged to the outside of the airfoil 2000 through the cooling hole 2003 adjacent to the leading edge LE, the air curtain effect may be more increased.

In the airfoil according to the first embodiment of the present disclosure as described above, the cooling efficiency may be increased by: i) cooling by collision of the cooling fluid with the inner cooling flow path 2220; ii) increasing the cooling time due to inner flow of the cooling fluid in the inner cooling flow path 2220; and iii) increasing the air curtain effect due to discharge of the cooling fluid through the cooling hole 2003 that is adjacent to the leading edge LE.

Figure 7:
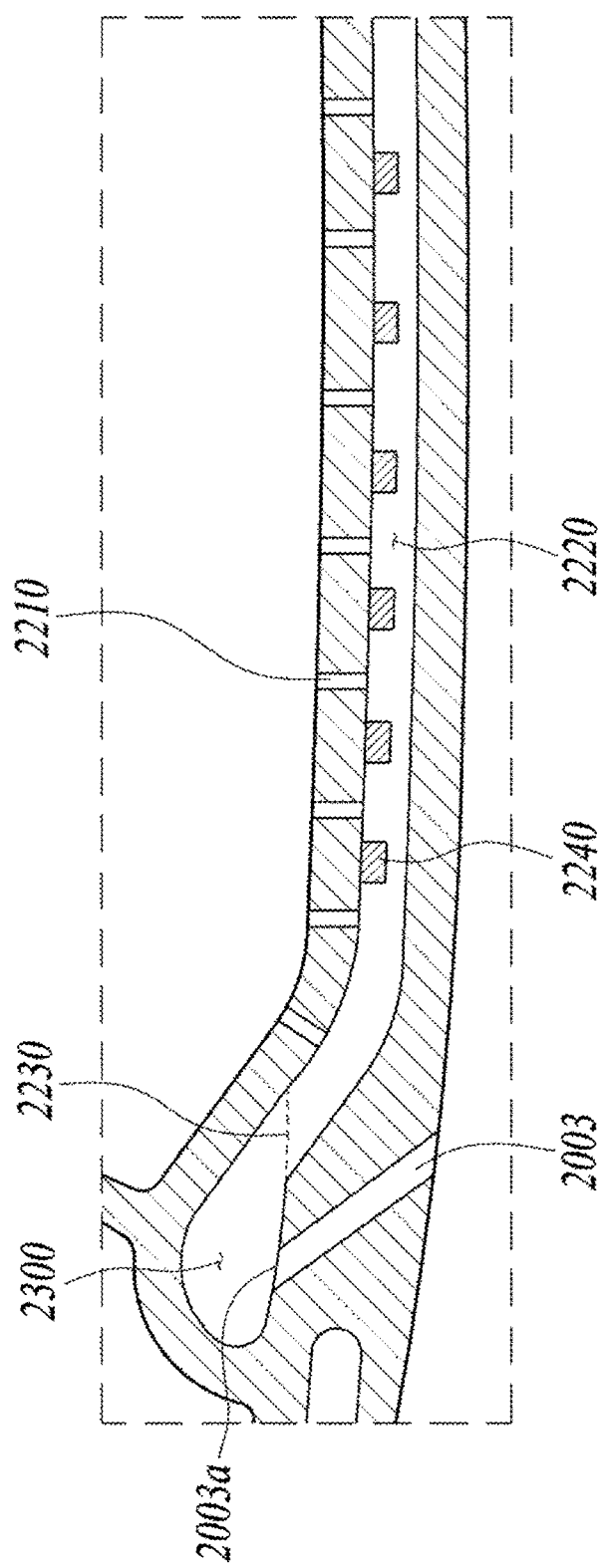
FIG. 7 is a plan view enlarging and illustrating the part B in FIG. 4 and illustrating a portion of the airfoil according to a second embodiment of the present disclosure.

FIG. 7 is a plan view enlarging and illustrating the part B in FIG. 4 and illustrating a portion of the airfoil according to a second embodiment of the present disclosure.

Referring to FIG. 7, the cooling flow path part 2200 of the present embodiment includes the collision jet hole 2210, the inner cooling flow path 2220, the cooling flow path outlet 2230, and a first cooling fin 2240. Since the collision jet hole 2210, the inner cooling flow path 2220, and the cooling flow path outlet 2230 of the airfoil according to the second embodiment of the present disclosure are substantially the same as the first embodiment described above, the repeated description is omitted.

The first cooling fin 2240 protrudes by a predetermined size in a direction from the first surface to the second surface of the inside of the wall body forming the inner cooling flow path 2220, and is formed by being spaced apart from the second surface. FIG. 7 is a view illustrating an example in which the first cooling fin 2240 protrudes toward a lower surface (outer surface) from an upper surface (inner surface) of the inside of the wall body forming the inner cooling flow path 2220. In addition, the first cooling fin 2240 is formed between any one collision jet hole 2210 and the adjacent collision jet hole 2210.

A portion of the cooling fluid flowing through the inner cooling flow path 2220 collides with the first cooling fin 2240 and then forms a vortex, and the remaining cooling fluid flows straight toward the cooling flow path outlet 2230. That is, the first cooling fin 2240 may increase the cooling efficiency by giving a vortex and a straightness to the cooling fluid.

In the airfoil according to the second embodiment of the present disclosure as described above, the cooling efficiency may be increased by: i) cooling by collision of the cooling fluid with the inner cooling flow path 2220; ii) increasing the cooling efficiency by the first cooling fin 2240; and iii) increasing the air curtain effect due to discharge of the cooling fluid through the cooling hole 2003 that is adjacent to the leading edge LE.

Figure 8:
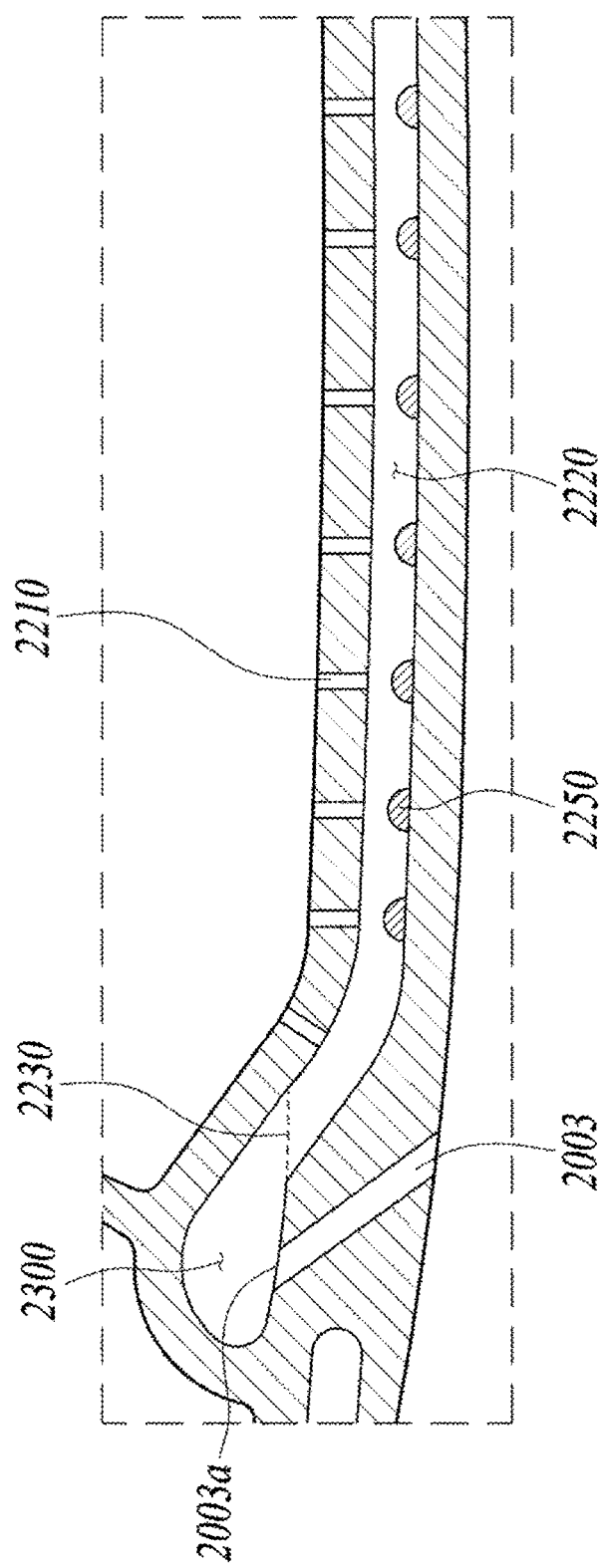
FIG. 8 is a plan view enlarging and illustrating the part B in FIG. 4 and illustrating a portion of the airfoil according to a third embodiment of the present disclosure.

FIG. 8 is a plan view enlarging and illustrating the part B in FIG. 4 and illustrating a portion of the airfoil according to a third embodiment of the present disclosure.

Referring to FIG. 8, the cooling flow path part 2200 of the present embodiment includes the collision jet hole 2210, the inner cooling flow path 2220, the cooling flow path outlet 2230, and a cooling protrusion 2250. Since the collision jet hole 2210, the inner cooling flow path 2220, and the cooling flow path outlet 2230 of the airfoil according to the third embodiment of the present disclosure are substantially the same as the first embodiment described above, the repeated description is omitted.

The cooling protrusion 2250 is formed below the collision jet hole 2210. The cooling protrusion 2250 protrudes by a predetermined size toward the first surface (upper surface) from the second surface (lower surface) of the inside of the wall body forming the inner cooling flow path 2220.

The cooling fluid introduced through the collision jet hole 2210 in a vertical direction is firstly cooling the suction side 2001 or the pressure side 2002 by being collided (collision jet) with the cooling protrusion 2250 and by being dispersed in a radial direction, and performs a second cooling by flowing along the inner cooling flow path 2220, and then is discharged through the cooling flow path outlet 2230.

At this time, since a distance between the collision jet hole 2210 and the inner cooling flow path 2220 is reduced by the size of the cooling protrusion 2250, a collision distance is shortened, thereby being capable of increasing the collision cooling efficiency. In addition, an area in contact with the cooling fluid increases as the size of the cooling protrusion 2250 increases, thereby increasing the collision cooling efficiency.

In the airfoil according to the third embodiment of the present disclosure as described above, the cooling efficiency may be increased by: i) increasing the cooling efficiency by reducing the collision distance by the cooling protrusion 2250; ii) increasing the cooling efficiency by increasing the collision area by the cooling protrusion 2250; and iii) increasing the air curtain effect due to discharge of the cooling fluid through the cooling hole 2003 that is adjacent to the leading edge LE.

Figure 9:
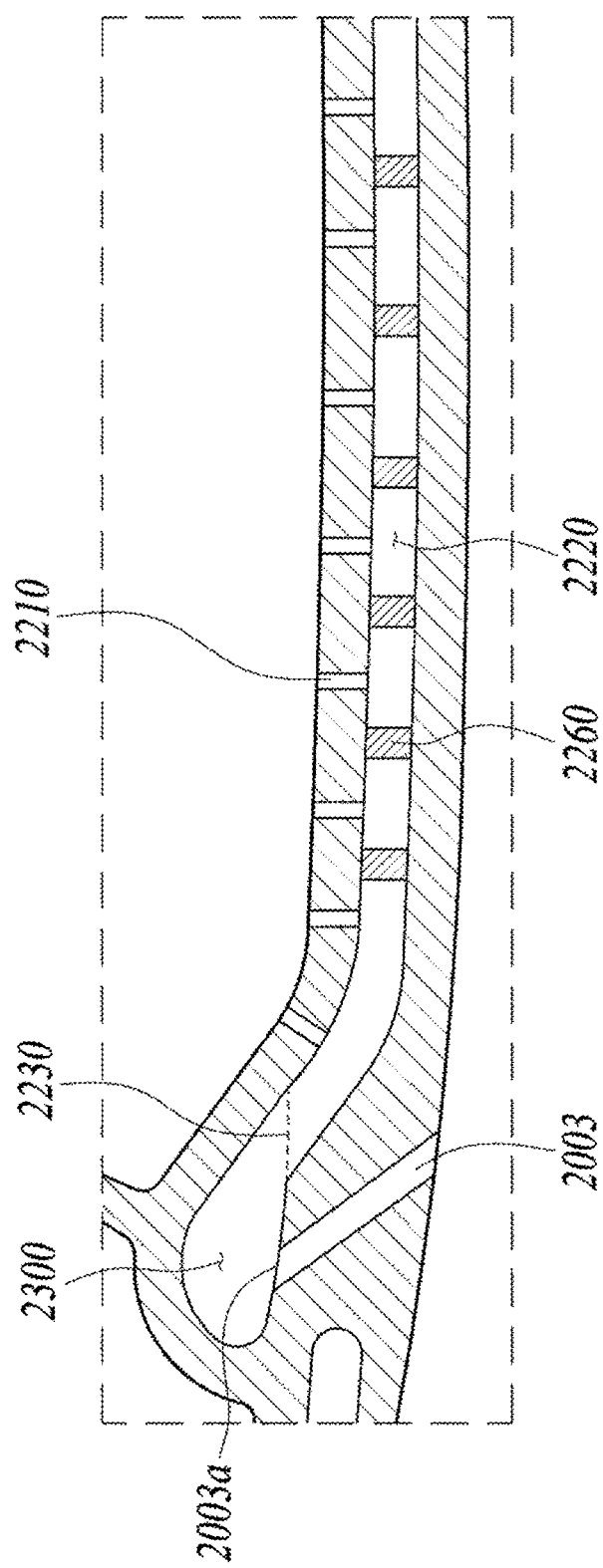
FIG. 9 is a plan view enlarging and illustrating the part B in FIG. 4 and illustrating a portion of the airfoil according to a fourth embodiment of the present disclosure.

FIG. 9 is a plan view enlarging and illustrating the part B in FIG. 4 and illustrating a portion of the airfoil according to a fourth embodiment of the present disclosure.

Referring to FIG. 9, the cooling flow path part 2200 of the present embodiment includes the collision jet hole 2210, the inner cooling flow path 2220, the cooling flow path outlet 2230, and a second cooling fin 2260. Since the collision jet hole 2210, the inner cooling flow path 2220, and the cooling flow path outlet 2230 of the airfoil according to the fourth embodiment of the present disclosure are substantially the same as the first embodiment described above, the repeated description is omitted.

The second cooling fin 2260 may generate turbulence in the flow of the cooling fluid that flows inside the inner cooling flow path 2220. In addition, the second cooling fin 2260 may improve structural rigidity of the airfoil wall sides (the pressure side and the suction side) that are weakened by the inner cooling flow path 2220. In addition, the second cooling fin 2260 may increase the cooling efficiency due to the cooling fluid by increasing the heat transfer area.

Specifically, the second cooling fin 2260 may be a fin structure formed over any first surface and the facing surface of the inner cooling flow path 2220. The fin structure may be formed in various shapes such as a polygonal shape, a circular shape, an X shape, and so on. In addition, the second cooling fin 2260 is formed between any one collision jet hole 2210 and the adjacent collision jet hole 2210.

In the airfoil according to the fourth embodiment of the present disclosure as described above, the cooling efficiency may be increased by: i) cooling by collision of the cooling fluid with the inner cooling flow path 2220; ii) increasing the cooling efficiency by the turbulence caused by the second cooling fin 2260; and iii) increasing the air curtain effect due to discharge of the cooling fluid through the cooling hole 2003 that is adjacent to the leading edge LE.

Figure 10:
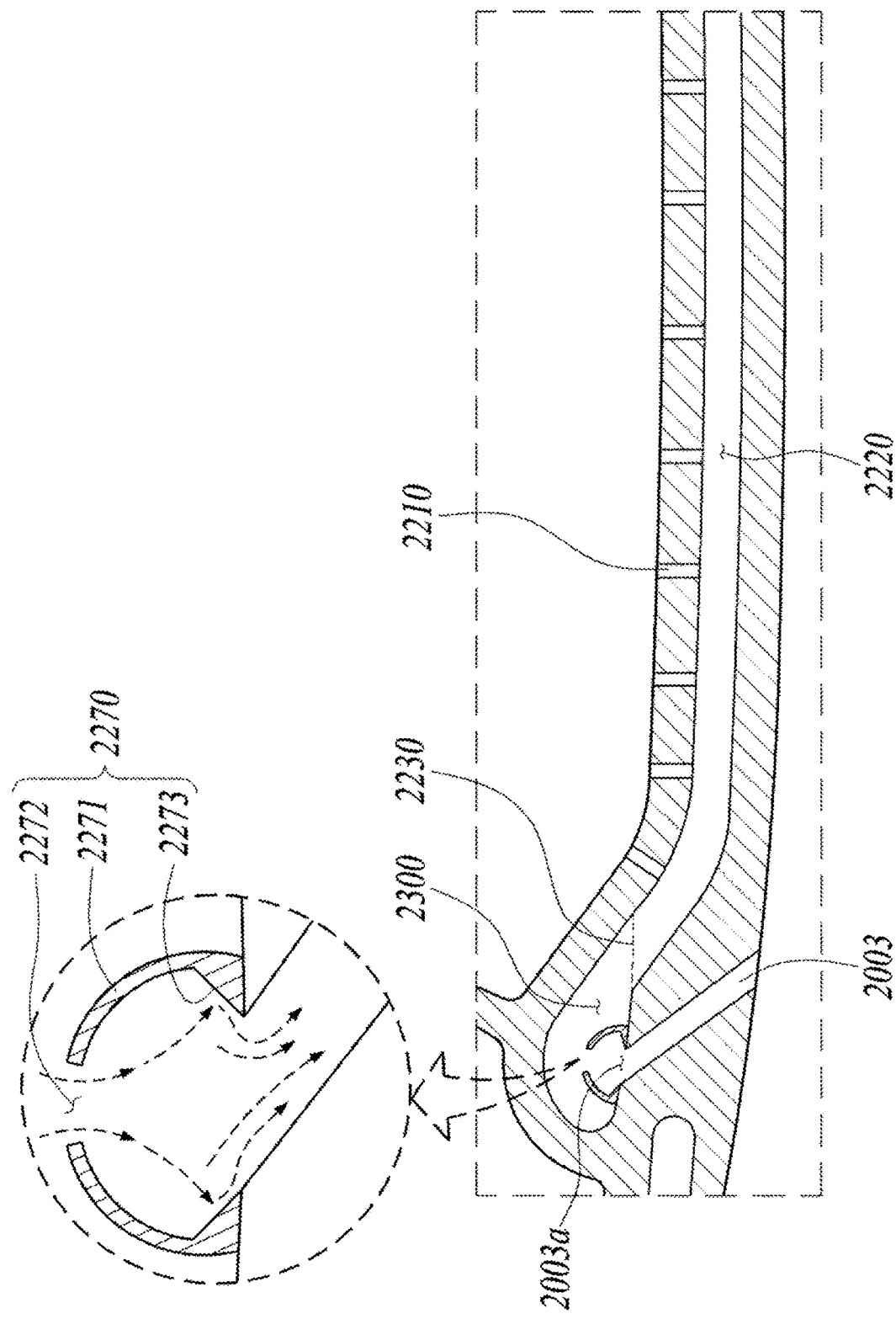
FIG. 10 is a plan view enlarging and illustrating the part B in FIG. 4 and illustrating a portion of the airfoil according to a fifth embodiment of the present disclosure.

FIG. 10 is a plan view enlarging and illustrating the part B in FIG. 4 and illustrating a portion of the airfoil according to a fifth embodiment of the present disclosure.

Referring to FIG. 10, the cooling flow path part 2200 of the present embodiment includes the collision jet hole 2210, the inner cooling flow path 2220, the cooling flow path outlet 2230, and a collision cavity 2270. Since the collision jet hole 2210, the inner cooling flow path 2220, and the cooling flow path outlet 2230 of the airfoil according to the fifth embodiment of the present disclosure are substantially the same as the first embodiment described above, the repeated description is omitted. The fifth embodiment may be applied in combination with at least one of the first embodiment to the fourth embodiment described above.

The collision cavity 2270 includes a collision induction member 2271 which has a predetermined shape and which is formed in an inner space of the sub-cavity 2300, and includes a collision induction inlet 2272 formed by opening a portion of the collision induction member 2271.

The collision induction member 2271 may be a plate member formed in a polyhedral shape or a hemispherical shape formed so as to surround the cooling hole inlet 2003a. The collision induction inlet 2272 may be formed by opening an upper portion of the cooling hole inlet 2003a in the plate member.

The collision cavity 2270 is configured such that the cooling fluid collides with the surface of the wall body forming the suction side 2001 or the pressure side 2002 so that the secondary collision cooling is performed before the cooling fluid discharged through the cooling flow path outlet 2230 is discharged to the outside through the cooling hole 2003.

At this time, in order to facilitate the discharge of the secondary collided cooling fluid, an inclined surface 2273 having a shape in which an upper portion thereof is wide and a lower portion thereof is narrow may be formed around the cooling hole inlet 2003a.

According to the airfoil according to the fifth embodiment of the present disclosure as described above, in addition to the effects of the first embodiment to the fourth embodiment described above, the cooling efficiency may be further increased by realizing the secondary collision cooling of the cooling fluid with the collision cavity 2270 before the cooling fluid is discharged through the cooling hole 2003.

The inner structures (the first embodiment to the fifth embodiment) of the airfoil described above could not be manufactured previously due to the complex shape. However, when a recently developed metal 3D printing technology is applied, the airfoil having an integrated continuous structure is capable of being manufactured rather than separately manufacturing and assembling components.

While exemplary embodiments have been described with reference to the accompanying drawings, it will be apparent to those skilled in the art that various variations and modifications may be made by adding, changing, or removing components without departing from the spirit and scope of the present disclosure as defined in the appended claims, and these variations and modifications fall within the spirit and scope of the present disclosure as defined in the appended claims. In addition, it is noted that any one feature of an embodiment of the present disclosure described in the specification may be applied to another embodiment of the present disclosure.

What is claimed is:
1. An airfoil comprising:
a suction side and a pressure side that are each provided with a cooling hole;
at least one main cavity which is formed in an inner space formed by the suction side and the pressure side and into which a cooling fluid is introduced;
an inner cooling flow path formed inside a wall body forming the pressure side and the suction side, the inner cooling flow path comprising a plurality of collision jet holes;

the collision jet holes being configured to impinge the cooling fluid against a first inner wall surface of the inner cooling flow path and to direct the cooling fluid along the inner cooling flow path toward a cooling flow path outlet formed on an end portion of the inner cooling flow path, thereby providing both impingement and convective cooling; and a sub-cavity formed such that the sub-cavity protrudes into the inner space from inner surfaces of the suction side and the pressure side and surrounds the inner cooling flow path outlet, the sub-cavity being configured such that the inner cooling flow path outlet and a cooling hole inlet are in communication with each other.

2. The airfoil of claim 1, wherein the plurality of collision jet holes are formed along a longitudinal direction of the inner cooling flow path from a trailing edge side toward a leading edge side of the airfoil.

3. The airfoil of claim 1, wherein the collision jet holes are formed on a trailing edge side, and the inner cooling flow path outlet is formed on a leading edge side.

4. The airfoil of claim 1, wherein the sub-cavity is provided as a plurality of sub-cavities formed in the inner surfaces of the suction side and the pressure side along a span direction.

5. The airfoil of claim 1, comprising a first fin which protrudes toward a second surface inside a wall body from a first surface inside the wall body forming the inner cooling flow path and which is formed by being spaced apart from the second surface inside the wall body.

6. The airfoil of claim 5, wherein the first cooling fin is formed between any one collision jet hole and an adjacent collision jet hole of the plurality of collision jet holes.

7. The airfoil of claim 1, comprising a cooling protrusion which protrudes toward a first surface inside a wall body from a second surface inside the wall body forming the inner cooling flow path and which is formed below the plurality of collision jet holes.

8. The airfoil of claim 1, comprising a second cooling fin formed by connecting a first surface and a second surface inside a wall body to each other, the wall body forming the inner cooling flow path.

9. The airfoil of claim 8, wherein the second cooling fin is formed between any one collision jet hole and an adjacent collision jet hole of the plurality of collision jet holes.

10. The airfoil of claim 1, further comprising a collision cavity configured such that the cooling fluid collides with a surface of the wall body forming the suction side or with a surface of the wall body forming the pressure side before the cooling fluid discharged through the inner cooling flow path outlet is discharged to an outside through the cooling hole.

11. A gas turbine comprising:
a compressor configured to compress air that is introduced thereinto;
a combustor configured to mix fuel with air that is compressed in the compressor and to combust a mixture of the compressed air and the fuel; and
a turbine configured to generate power from gas combusted in the combustor, the turbine comprising a turbine vane configured to guide the combustion gas on a combustion gas path through which the combustion gas passes, and the turbine comprising a turbine blade configured to be rotated by the combustion gas on the combustion gas path,
wherein at least one of the turbine vane or the turbine blade comprises an airfoil, and the airfoil comprises:

a suction side and a pressure side that are each provided with a cooling hole;

at least one main cavity which is formed in an inner space formed by the suction side and the pressure side and into which a cooling fluid is introduced;

an inner cooling flow path formed inside a wall body forming the pressure side and the suction side, the inner cooling flow path comprising a plurality of collision jet holes;

the collision jet holes being configured to impinge the cooling fluid against a first inner wall surface of the inner cooling flow path and to direct the cooling fluid along the inner cooling flow path toward a cooling flow path outlet formed on an end portion of the inner cooling flow path, thereby providing both impingement and convective cooling; and a sub-cavity formed such that the sub-cavity protrudes into the inner space from inner surfaces of the suction side and the pressure side and surrounds the inner cooling flow path outlet, the sub-cavity being configured such that the inner cooling flow path outlet and a cooling hole inlet are in communication with each other.

12. The gas turbine of claim 11, wherein the collision jet holes are formed along a longitudinal direction of the inner cooling flow path from a trailing edge side of the airfoil toward a leading edge side of the airfoil.

13. The gas turbine of claim 11, wherein the sub-cavity is provided as a plurality of sub-cavities formed in the inner surfaces of the suction side and the pressure side along a span direction.

14. The gas turbine of claim 11, comprising a first fin which protrudes toward a second surface inside a wall body from a first surface inside the wall body forming the inner cooling flow path and which is formed by being spaced apart from the second surface inside the wall body.

15. The gas turbine of claim 14, wherein the first cooling fin is formed between any one collision jet hole and an adjacent collision jet hole of the plurality of collision jet holes.

16. The gas turbine of claim 11, comprising a cooling protrusion which protrudes toward a first surface inside a wall body from a second surface inside the wall body forming the inner cooling flow path and which is formed below the plurality of collision jet holes.

17. The gas turbine of claim 11, comprising a second cooling fin formed by connecting a first surface and a second surface inside a wall body to each other, the wall body forming the inner cooling flow path.

18. The gas turbine of claim 17, wherein the second cooling fin is formed between any one collision jet hole and an adjacent collision jet hole of the plurality of collision jet holes.

19. The gas turbine of claim 11, further comprising a collision cavity configured such that the cooling fluid collides with a surface of the wall body forming the suction side or with a surface of the wall body forming the pressure side before the cooling fluid discharged through the inner cooling flow path outlet is discharged to an outside through the cooling hole.

* * * * *